April 10, 1945. B. E. LUBOSHEZ 2,373,406
RANGE FINDER
Filed April 16, 1943 2 Sheets-Sheet 1

BENJAMIN E. LUBOSHEZ
INVENTOR
BY
ATTORNEYS

April 10, 1945.   B. E. LUBOSHEZ   2,373,406
RANGE FINDER
Filed April 16, 1943   2 Sheets-Sheet 2
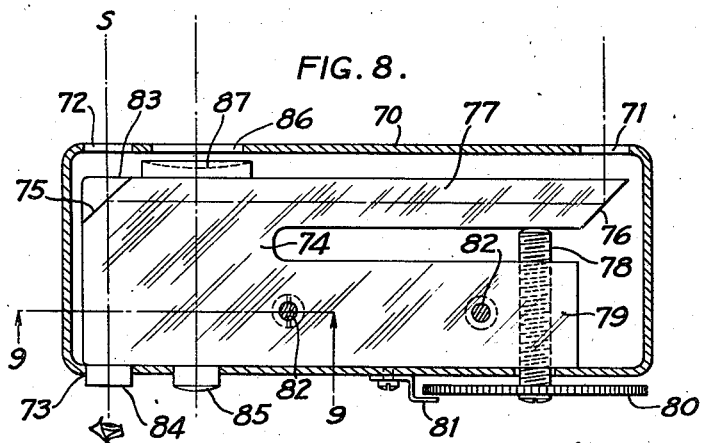
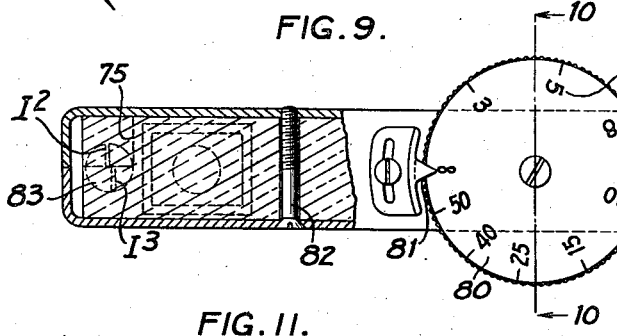
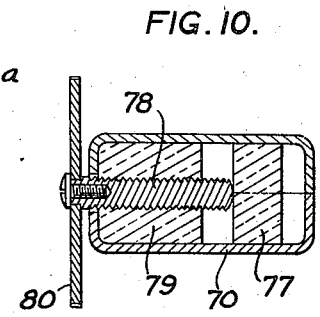
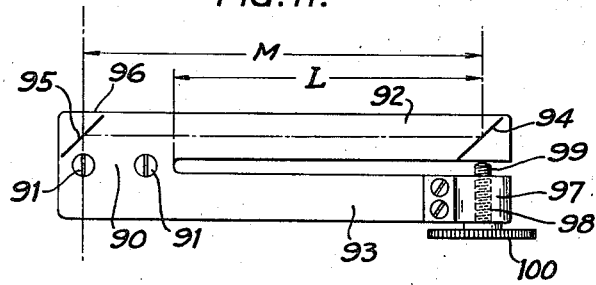
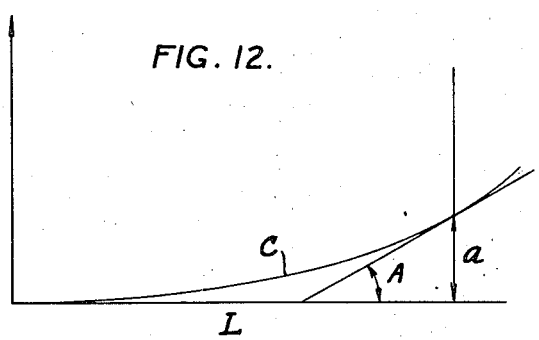
BENJAMIN E. LUBOSHEZ
INVENTOR
BY
ATTORNEYS Patented Apr. 10, 1945

2,373,406

UNITED STATES PATENT OFFICE 2,373,406

RANGE FINDER

Benjamin E. Luboshez, Rochester, N. Y., assignor to Eastman Kodak Company, Rochester, N. Y., a corporation of New Jersey Application April 16, 1943, Serial No. 483,265

15 Claims. (Cl. 88—2.4)

This invention relates to range finders and particularly to simple and inexpensive range finders of a type particularly adapted for use in photography. One of the objects of my invention is to provide a range finder with which accurate distance readings may be obtained and of an extremely simple type. Another object of my invention is to provide a range finder with a construction which permits reflectors to be accurately mounted with a minimum of difficulty. Still another object is to provide a range finder in which the moving parts are reduced to a minimum and other objects will appear from the following specification, the novel features being particularly pointed out in the claims at the end thereof.

With known types of range finders, certain parts have to be made with a high degree of accuracy in order to obtain accurate results. One of the chief difficulties of such range finders is mounting two or more reflecting elements in spaced relationship and at the same time maintaining absolute parallelism, and also at the same time providing for the movement of one reflector relative to the other. Usually this movement is obtained by mounting one reflector on a pivoted arm, but if this is done the assembly operation must necessarily be the operation in which the relative adjustment of the mirrors or other reflectors are determined.

In addition, it has been customary to move the pivot carrying one reflector by means of a cam or other suitable structure so that a number of very accurately formed parts have been usually required in order to make a satisfactory range finder.

One of the primary objects of my invention is to reduce the number of accurate parts and assembling operations which may be necessary in making and assembling a range finder and where accuracy is required to provide a relatively simple means of producing such accurately formed parts.

Coming now to the drawings wherein like reference characters denote like parts throughout:

Fig. 8 is a longitudinal section through a range finder constructed with still another embodiment of my invention;

Fig. 9 is a part section and part elevation of the range finder shown in Fig. 8, the sectional portion being taken on lines 9—9 thereof;

Fig. 10 is a section taken on line 10—10 of Fig. 9;

Fig. 11 is a schematic view of a range finder element constructed in accordance with still another embodiment of my invention; and Fig. 12 is a diagram illustrating a means for determining the required deflection of one reflecting element relative to the other.

My invention consists broadly in providing a range finder in which a unit carrying the reflecting elements can be readily formed with the required degree of accuracy. This unit preferably either carries integrally or attached thereto two reflecting elements which can be assembled or which are formed directly on the unit. Thus, the necessity of assembling the reflectors accurately as the complete range finder is assembled may be eliminated.

Figure 1:
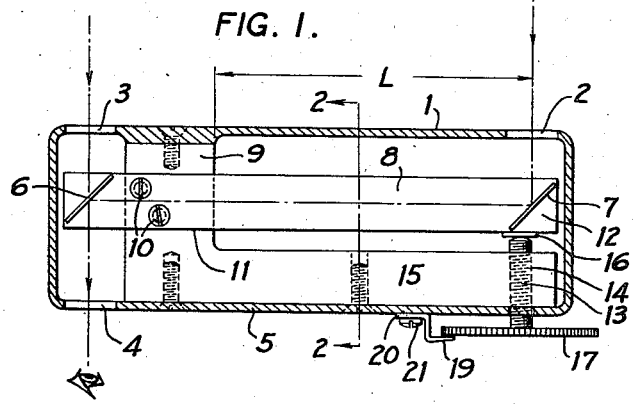
Fig. 1 is a longitudinal section through a typical range finder constructed in accordance with and embodying a preferred form of my invention.
Figure 2:
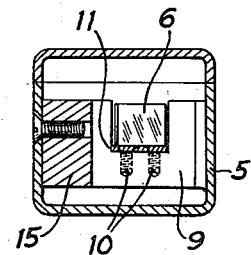
Fig. 2 is a section taken on line 2—2 of Fig. 1.
Figure 3:
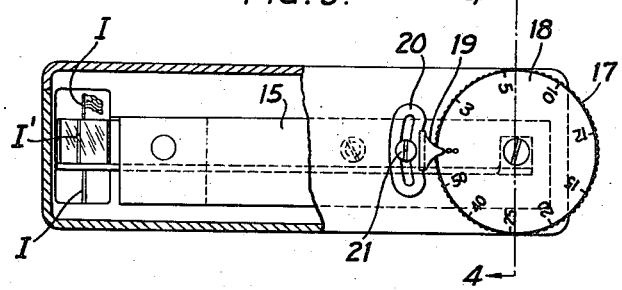
Fig. 3 is a part section and part rear elevation of the range finder shown in the preceding figures.
Figure 4:
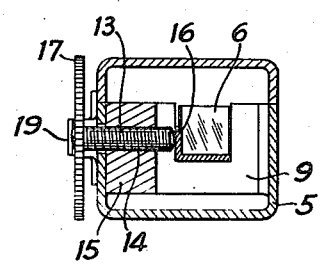
Fig. 4 is a section taken on line 4—4 of Fig. 3.

Referring to Fig. 1 a preferred embodiment of my invention is shown in which the range finder may include a casing 1 having windows 2 and 3 in the front wall thereof and a viewing window 4 in the rear wall 5. The window 4 enables an operator to view portions of an image I being viewed directly, and another portion I' may be viewed through the reflectors 6 and 7. The reflectors 6 and 7 should be in accurate parallel relationship for infinity and this relationship can be obtained when the reflectors are mounted on the base 8 which consists preferably of a single piece of somewhat springy metal. This strip of metal may be rigidly held in a bracket 9 as by means of screws 10, and I preferably provide a groove 11 in the bracket 9 in which the edges of the metal strip 11 accurately fit so that one end of the lever 8 will be firmly anchored against movement and so that the opposite end 12 of the lever 8 may be unsupported. The strip of metal 8 forms a cantilever so arranged that the mirror 6 is rigidly held in position with respect to the casing 1 and the mirror 7 is movably held in position, since it may be moved by means of a screw 13 passing through a tapped opening 14 in arm 15 of the bracket 9, and so that the end of the screw may rest against a lug 16 carried by the metal strip 8. The screw 13 is provided with an enlarged head 17 which may be turned and a scale 18 graduated into suitable units, such as feet or meters, may be provided on the head 17 to cooperate with a pointer 19 which is preferably movably mounted on a support 20 by means of screws 21.

With a range finder of the type described the operator looks through the openings 3 and 4, and by turning the screwhead 17 he registers the images I and I' of the entire object he desires to measure. When the images register, he can read off from the scale 18 and pointer 19 the number of feet that the object is from the observer. This movement of the screw 13 flexes the bar 8 and consequently alters the relative relationship of the mirror 7 relative to the mirror 6. It will be noticed that with this form of my invention there is no pivoted lever carrying one of the reflectors and thus the usual difficulty of making an accurately formed pivotal support which must be accurately aligned up with a fixed mirror or reflector is completely avoided. It is only necessary to flex the bar 8 a slight distance with the usual relatively short base type of range finders used for photography to obtain the focus of distances from, say, 4 feet to infinity.

Figure 5:
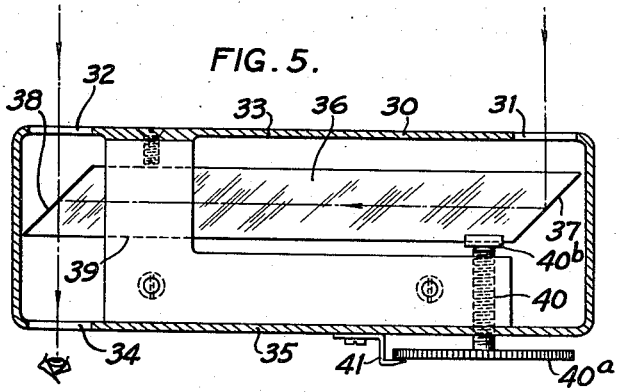
Fig. 5 is a view similar to Fig. 1 but of a second embodiment of my invention.

A second form of my invention shown in Fig. 5, while employing the same type of cantilever construction is even more simple than the form of the invention shown in Fig. 1 because it reduces the difficulty of providing a unit including two spaced and normally parallel reflectors. This is done by making a single unit out of glass or a clear thermo-plastic or other suitable material in the form of a square bar of material. The reflectors may be made by molding or casting, although it may be necessary for the best results to grind or polish these surfaces. However, where the reflecting surfaces are carried by a single piece of material it is easier to form them as a unit rather than to assemble separate reflectors either in the range finder casing or on a common support.

Specifically, the range finder in Fig. 5 may consist of a casing 30 having spaced windows 31 and 32 in the front wall 33 of the casing and having a viewing window 34 in the rear wall 35 of the casing. A solid block 36 of glass or plastic is provided with angularly disposed ends 37 and 38, these ends being accurately formed or faced into a normal parallel relationship and, if desired, being silvered. The normal relationship therefore of the reflecting surfaces can be held accurately. The block 36 is then inserted into a square aperture 39 accurately fitting the block so as to anchor that end of the block 36 carrying the reflector 38. Since the opposite end of the block 36 carries the reflector 37 and since it may flex the comparatively slight distance necessary for the purpose, the block 36 itself forms the cantilever which can be moved by means of a screw 40 having a large head 40a and impinging on a metal buffer 40b carried by the block. Thus the screw 40 may be turned and a scale on the face of this screw (not shown) will indicate at the pointer 41 the focal setting. This embodiment, like the first embodiment, of my invention is provided with a cantilever and there is but one moving part, that is the screw by which the end of the cantilever is flexed for various distance settings. There is, therefore, very little difficulty liable to arise due to any of the parts getting out of adjustment and as long as the elastic limit of the particular material used for the cantilever is not exceeded, there should be no difficulty in having the cantilever return to its normal position.

Figure 6:
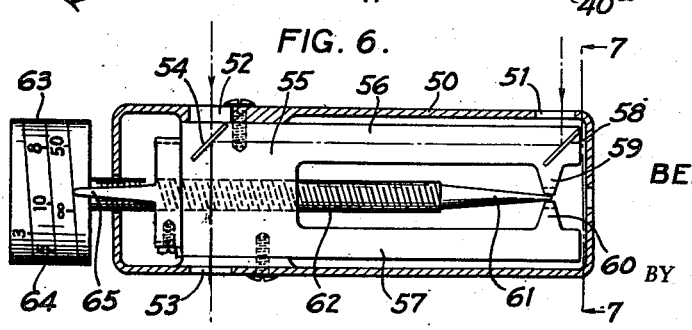
Fig. 6 is a view similar to Figs. 1 and 5 but of a third embodiment of my invention.
Figure 7:
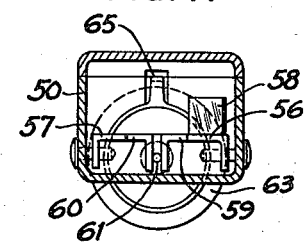
Fig. 7 is a section taken on line 7—7 of Fig. 6.

In the embodiment of my invention shown in Figs. 6 and 7, I utilize a double cantilever because this permits of much finer adjustment should this be deemed necessary. These figures show a casing 50 having spaced windows 51 and 52 in the front wall and a viewing window 53 in the rear wall. There is a fixed reflector 54 carried by the base 55 which is formed into two similar legs 56 and 57, these legs forming cantilevers. On the end of leg 56 there is a reflector 58 and an inwardly projecting lug 59. On the end of leg 57 there is an inwardly projecting lug 60, the lugs 59 and 60 being so positioned that a cam 61 carried on the screw 62 may be moved in and out causing the legs 56 and 57, which are of the same cross section, to spring similar distances. This springing or flexing moves both arms and a comparatively small movement of the mirror 58 requires considerable movement of the cam 61. The screw 62 may be turned by the head 63 having a spiral scale 64 to cooperate with the pointer 65. While the system used in the range finder shown in Figs. 6 and 7 employs a double cantilever, which permits a very fine adjustment, nevertheless the construction is such that the mirrors 54 and 58 or prisms, if they should be used instead of mirrors, can be mounted on the single unit 55 and thus they can be readily adjusted to the proper relationship before assembling the range finder in the casing.

I have also considered providing a simple type of range finder made from a single block of glass or plastic in accordance with Figs. 8 to 10 inclusive. As shown in these figures, the casing 70 has spaced windows 71 and 72 in the front as well as a viewing window 73 in the back wall of the casing. Inside the casing there is a single block 74 of plastic carrying the reflecting surface 75, which is fixed, and 76 which is on the end of a cantilever 77 which may be flexed as by a screw 78 passing through an anchored end 79 of the plastic block and including an operating wheel 80 having a scale 80a cooperating with a pointer 81. The block of plastic 74 may be anchored as by screws 82 to the casing and in this form I prefer to provide the block of plastic with a wall 83 just beneath the reflecting surface 75 which is at right angles to the line of sight S. Thus, when the operator views the desired image he will see in a divided field images $I^2$ and $I^3$ which can be made to register by turning the wheel 80.

While I have found it possible to make quite accurate castings of plastic material, I may prefer to provide a plastic rod or extension with a surface 84 which may, if desired, be readily faced or polished to form an optically flat surface. I also prefer to provide a curved surface 85 forming an eyepiece for viewing a field of view determined by the frame 86 and the collecting lens comprising the concave surface 87 also formed integrally with the plastic block 74. Thus, in this embodiment of my invention the same type of cantilever construction is shown and, in addition, I provide a view finder which defines the field of view which may coincide with that of a particular camera for which the range finder is designed. The mirrors are separated a distance M which is somewhat longer than the cantilever's effective length L.

It is, of course, possible to get a finer movement by making a range finder element of the type shown in Fig. 11 wherein the solid plastic block 90 may be anchored to a support by screws 91, this plastic block having like cantilever arms 92 and 93 each of which may spring. The arm 92 carries the movable reflecting surface 94 and the anchored end 90 carries the fixed reflecting surface 95 and, just beneath it, the surface 96 at right angles to the normal line at sight S. The other cantilever arm 93 may be provided with a ferrule 97 having a threaded opening 98 through which the adjusting screw 99 passes, this screw having a head 100 for flexing the cantilever arms 92 and 93.

Since it is much simpler to design an instrument in which the cantilever arm or arms are of a known cross section throughout, I have shown such construction, but of course the cross section of the arms forming the cantilevers may differ throughout their length, or if two cantilevers are used may have different flexing characteristics if such should prove desirable. Since I am primarily interested in producing an extremely inexpensive range finder, I prefer to provide only one cantilever and of a fixed dimension throughout because it is a simple matter to figure out the requirements of such a device. For instance, in referring to Fig. 12 the angle (A), through which the mirror 7 of Fig. 1 is deflected for any given small movement (a) of the point of the screw 13, is easily determined. In Fig. 12 the curve (c) represents the deflection of the simple cantilever 8, which is assumed to be of uniform cross section. Then if (L) = the distance from the support to the point of the screw and (k) = a constant $$a = KL^3 \text{ or } K = a/L^3$$

then $$\operatorname{Tan} A = da/dL$$
$$= 3KL^2$$
$$= 3a/L$$

and $$\operatorname{Tan} B = 6a/L$$

where B is the angle subtended by the base at the object ranged upon. This applies to the simple cantilever arrangements shown in Figs. 1, 5 and 8, but not to the devices shown in Figs. 6 and 11. In the double cantilever arrangement (as shown in these figures) Tan A would be only a fraction of the above. For the case with equal cantilevers $$\operatorname{Tan} A = 3a/2L \text{ and } \operatorname{Tan} B = 3a/L$$

It will be noticed that with all the embodiments described above I have employed a cantilever system with the anchored end of the cantilever carrying a fixed reflector and the free end of the cantilever carrying a reflector which may be moved by flexing the lever itself. Such construction greatly simplifies a range finder, particularly the small so-called pocket range finders used for photographic purposes. Such a device has a very few parts and there is little in it which is liable to get out of adjustment. The parts are such that they can be readily produced in large quantities. The structure is such that the assembling operation can be carried out with relatively unskilled help because the sole structure which requires a high degree of accuracy is the reflector carrying element. The reflecting elements are formed in a single unit.

While it is obvious that various cantilever types of range finders can be readily worked out in accordance with my invention, I have nevertheless illustrated a few of the preferred embodiments. I consider as within the scope of my invention all such forms as may come within the appended claims.

I claim:

1. A range finder including a resilient arm, a support rigidly carrying one end of the arm with the other end thereof spaced from the support, reflecting surfaces carried by the resilient arm, one by the rigidly carried arm portion and the other by the end of the arm spaced from the support, and means for flexing the arm, a second flexible arm rigidly mounted to the support and projecting therefrom at the opposite end, the means for flexing the first arm being carried by the second flexible arm whereby both arms may be simultaneously flexed in adjusting one reflecting surface relatively to the other reflecting surface.

2. A range finder including a resilient arm, a support rigidly carrying one end of the arm with the other end thereof spaced from the support, reflecting surfaces carried by the resilient arm, one by the rigidly carried arm portion and the other by the end of the arm spaced from the support, and means for flexing the arm, a second flexible arm rigidly mounted to the support and projecting therefrom at the opposite end, the means for flexing the first arm being carried by the second flexible arm whereby both arms may be simultaneously flexed in adjusting one reflecting surface relatively to the other reflecting surface, the two flexible arms including predetermined flexing characteristics with respect to the base to which they are rigidly attached.

3. A range finder including a resilient arm, a support rigidly carrying one end of the arm with the other end thereof spaced from the support, reflecting surfaces carried by the resilient arm, one by the rigidly carried arm portion and the other by the end of the arm spaced from the support, and means for flexing the arm, a second flexible arm rigidly mounted to the support and projecting therefrom at the opposite end, the means for flexing the first arm being carried by the second flexible arm whereby both arms may be simultaneously flexed in adjusting one reflecting surface relatively to the other reflecting surface, the two flexible arms having similar flexibility with respect to the base to which one end of each arm is rigidly attached.

4. A range finder including a resilient light transmitting arm, a support rigidly carrying one end of the arm with the other end thereof spaced from the support, reflecting surfaces carried by the resilient arm, one by the rigidly carried arm portion and the other by the end of the arm spaced from the support, and means carried by the support for flexing the arm whereby the relation between said reflecting surfaces may be varied at will, said reflecting surfaces and resilient arm being formed of a single piece of light transmitting material and being positioned so that light reflected by one reflecting surface passes through the light transmitting material of the arm to the opposite light reflecting surface.

5. A range finder including a resilient arm, a support rigidly carrying one end of the arm with the other end thereof spaced from the support, reflecting surfaces carried by the resilient arm, one by the rigidly carried arm portion and the other by the end of the arm spaced from the support, and means for flexing the arm, a second flexible arm rigidly mounted to the support and projecting therefrom at the opposite end, the means for flexing the first arm being carried by the second flexible arm whereby both arms may be simultaneously flexed in adjusting one reflecting surface relatively to the other reflecting surface, the two flexible arms being formed from a single piece of flexible material.

6. A range finder including a resilient arm, a support rigidly carrying one end of the arm with the other end thereof spaced from the support, reflecting surfaces carried by the resilient arm, one by the rigidly carried arm portion and the other by the end of the arm spaced from the support, and means for flexing the arm, a second flexible arm rigidly mounted to the support and projecting therefrom at the opposite end, the means for flexing the first arm being carried by the second flexible arm whereby both arms may be simultaneously flexed in adjusting one reflecting surface relatively to the other reflecting surface, the two flexible arms being formed from a single piece of flexible light transmitting material, and said reflecting surfaces being formed directly on walls of the single piece of light transmitting material.

7. An element for range finders, including a solid block of light transmitting material having oppositely disposed reflecting surfaces carried thereby for passing light rays therethrough, said light transmitting material being capable of bending at least to a limited extent, and means for bending one portion only of said material, said bendable portion carrying one of said reflecting surfaces to vary the relation of one reflecting element relative to the other reflecting element.

8. A range finder including a solid block of light transmitting material through which light rays may pass and having normally parallel reflecting surfaces spaced apart, a support, means for anchoring one end only of the light transmitting material, and means for moving the opposite end of the light transmitting material, one of said reflecting surfaces being carried by the opposite end for varying the relationship of the reflecting surfaces.

9. A range finder including a solid block of light transmitting material through which light rays may pass and having normally parallel reflecting surfaces spaced apart, a support, means for anchoring one end only of the light transmitting material carrying one of said reflecting surfaces, and means for moving the opposite end of the light transmitting material, carrying the other of said reflecting surfaces for varying the relationship of the reflecting surfaces, said means including a movable member carried by the support and operatively engaging the light transmitting material.

10. A range finder including a solid block of light transmitting material having normally parallel reflecting surfaces spaced apart, a support, means for anchoring one end only of the light transmitting material carrying one of said reflecting surfaces, and means for moving the opposite end of the light transmitting material, carrying the other of said reflecting surfaces for varying the relationship of the reflecting surfaces, said means including a screw, a threaded opening in the support through which the screw passes, said screw being positioned to operatively engage the light transmitting material near the reflecting surface spaced from the anchored end of the light transmitting material.

11. A range finder including a support, a flexible cantilever arm anchored at one end to the support, reflecting surfaces on the anchored end and on the free end of the cantilever, a housing enclosing the support having spaced windows therein for passing light rays to the reflecting surfaces, one window including a materially larger view than that of the reflecting surface, and means for altering the relationship of the reflecting surfaces by flexing the cantilever arm.

12. A range finder of the type defined in claim 11 in which both reflecting surfaces are formed on a single piece of light refracting material having the property of bending to at least a limited extent.

13. A range finder of the type defined in claim 11 characterized by a cantilever arm made of a transparent flexible light refracting material having formed integral therewith said reflecting surfaces.

14. A range finder element of the type defined in claim 7 characterized by an area positioned adjacent one of said reflecting surfaces and at an angle thereto and at an angle for straight through observation of an object, a portion of the reflected image of which may be viewed at the same time from said adjacent reflector.

15. A range finder element of the type defined in claim 7 characterized by negative and positive curved surfaces formed of the single block of light transmitting material, the surfaces of which are selected to form a view finder of a field of view.

BENJAMIN E. LUBOSHEZ.